(No Model.)

W. ATWELL & R. FLOETER.
RIDDLE FOR EXTRACTING COCKLE AND WILD PEAS FROM GRAIN.

No. 321,881. Patented July 7, 1885.

Witnesses
A. Edmunds
Carl Hayden

Inventors
William Atwell
Robert Floeter
By P. J. Edmunds
Attorney

UNITED STATES PATENT OFFICE.

WILLIAM ATWELL AND ROBERT FLOETER, OF CHATHAM, ONTARIO, CANADA, ASSIGNORS OF ONE-THIRD TO MANSON CAMPBELL, OF SAME PLACE.

RIDDLE FOR EXTRACTING COCKLE AND WILD PEAS FROM GRAIN.

SPECIFICATION forming part of Letters Patent No. 321,881, dated July 7, 1885

Application filed April 11, 1884. (No model.) Patented in Canada February 4, 1884, No. 18,614.

*To all whom it may concern:*

Be it known that we, WILLIAM ATWELL and ROBERT FLOETER, both subjects of the Queen of Great Britain, and both residents of the town of Chatham, in the county of Kent, in the Province of Ontario, Canada, carpenters, have invented certain new and useful Improvements on Riddles for Extracting Cockle and Wild Peas from Grain, of which the following is a specification.

This invention relates to a screen or sieve which is placed in a grain-separator to remove the cockle and wild peas from the grain; and it consists of the improved construction and combination of parts of the same, as will be hereinafter more fully described and claimed, reference being had to the accompanying drawings, wherein—

Figure 1:
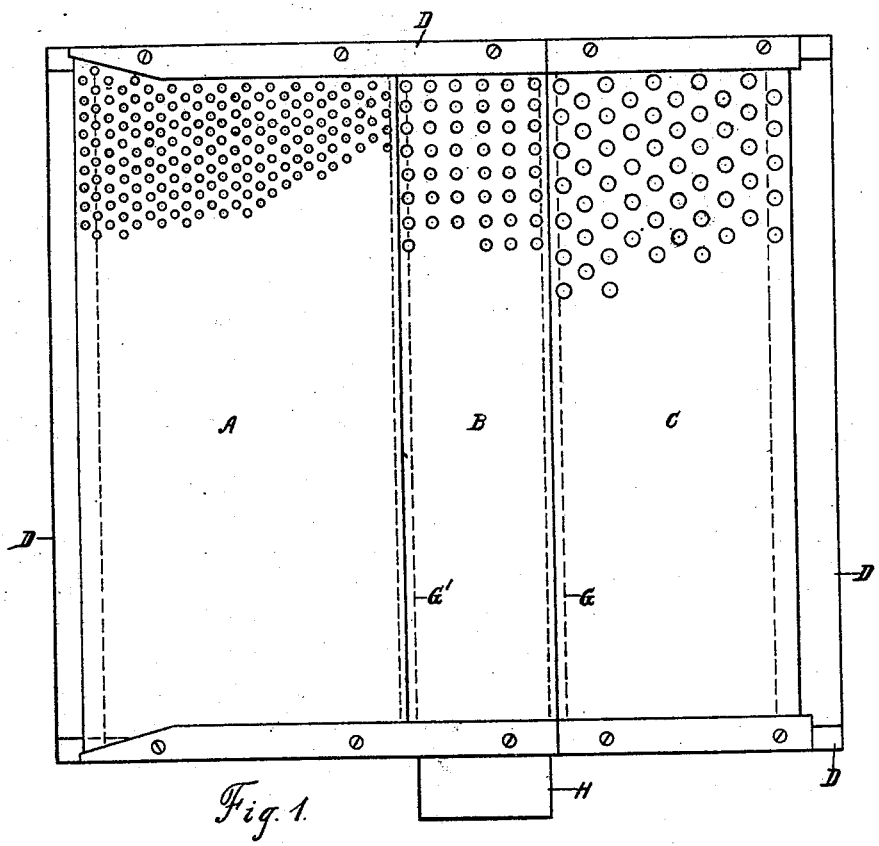
Figure 2:
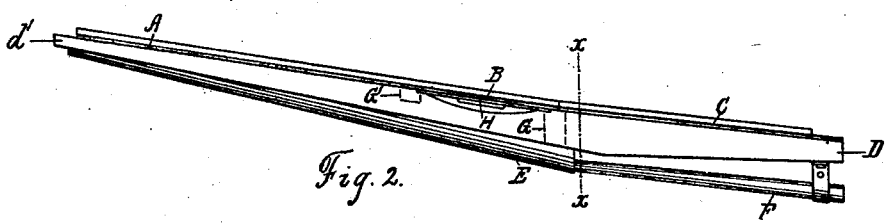
Figure 3:
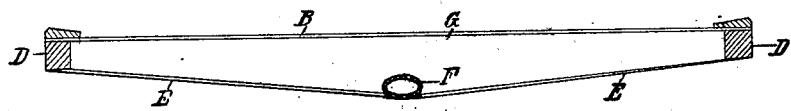

Figure 1 is a plan view of a riddle embodying our invention. Fig. 2 is a side elevation of same. Fig. 3 is a cross-sectional view on the line $x\ x$ of Fig. 2.

A B C designate three different grades of sieves firmly secured on the upper side of the frame D. In Fig. 1 of annexed drawings these sieves are only shown partly perforated; but they are intended to have their entire surfaces perforated. The perforations in the sieve A are about one-eighth of an inch in diameter, large enough to allow the cockle and other small seeds to pass through perfectly free. The perforations in the sieve B are about three-sixteenths of an inch in diameter, large enough to allow wild peas or tare to pass through perfectly free. The perforations in the sieve C are about one-quarter of an inch in diameter, large enough to allow the grain to pass through freely. The straws, thistle-heads, and other coarser impurities pass on and over off the riddle at the back of the machine.

E designates a tapered close bottom, constructed of sheet-iron or other suitable material, secured to the under side of the frame D, and situated a short distance below and extending beneath the surfaces of the sieves A and B only. This close bottom E is inclined from the end $d'$ toward the line $x\ x$, as shown in Fig. 2 of annexed drawings, and it also inclines from the sides toward the center, as shown in Fig. 3 of annexed drawings, for the purpose of conducting the impurities passing through the sieves A B to the chute F, which conducts them beyond the machine.

G is a cross-bar, extending across the frame D and closing the space between the end of the sieve B and the bottom E, to prevent any of the impurities passing over the end of said bottom E.

G' is another cross-bar, situated at the end of the sieve A and extending across the frame D, but very thin, so as not to interfere with the impurities passing through the sieve A from passing to the mouth of the chute F when the riddle is agitated.

A thin narrow strip of the adjacent upper edge of each of these cross-bars G G' is cut away to permit the slide H to rest on and be guided true as it is moved back and forth underneath the sieve B. By moving this slide H underneath the sieve B, seed of any kind is prevented from passing through it.

This riddle is secured in and agitated with the upper shoe of a grain-separator. The grain first falls on the sieve A of this riddle, where the cockle and other small seeds are extracted by passing through the perforations in said sieve A and falling on the close bottom E. The grain, as well as the wild peas or tare, passes on over the sieve B, where the wild peas and any stray seeds of cockle which may be carried on that far are extracted by passing through the perforations in the sieve B. The grain then passes on and falls through the perforations in the sieve C, and passes to the grading-sieves underneath, the cockle, wild peas, and other impurities passing to the mouth of the chute F, which delivers them beyond the machine.

Having thus described our invention, we claim—

The combination of the frame D, screens A B C, close bottom E, chute F, cross-bars G G', and slide H, substantially as shown and described, and for the purpose specified.

In testimony whereof we affix our signatures in the presence of the two undersigned witnesses.

WILLIAM ATWELL.
ROBERT FLOETER.

Witnesses:
MANSON CAMPBELL,
P. J. EDMUNDS.